(12) United States Patent
Choi et al.

(10) Patent No.: US 12,180,340 B2
(45) Date of Patent: Dec. 31, 2024

(54) POLYAMIDE RESIN, PREPARATION METHOD THEREFOF, AND POLYAMIDE FILM AND RESIN LAMINATE COMPRISING THE SAME

(71) Applicant: LG CHEM, LTD., Seoul (KR)

(72) Inventors: Il Hwan Choi, Daejeon (KR); Young Ji Tae, Daejeon (KR); Soonyong Park, Daejeon (KR); Youngseok Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 920 days.

(21) Appl. No.: 17/059,975

(22) PCT Filed: Nov. 1, 2019

(86) PCT No.: PCT/KR2019/014714
§ 371 (c)(1),
(2) Date: Nov. 30, 2020

(87) PCT Pub. No.: WO2020/096283
PCT Pub. Date: May 14, 2020

(65) Prior Publication Data
US 2021/0214497 A1    Jul. 15, 2021

(30) Foreign Application Priority Data

Nov. 5, 2018 (KR) .......... 10-2018-0134755
Dec. 3, 2018 (KR) .......... 10-2018-0153911
(Continued)

(51) Int. Cl.
*C08G 69/32* (2006.01)
*C08G 69/26* (2006.01)
(Continued)

(52) U.S. Cl.
CPC .......... *C08G 69/32* (2013.01); *C08G 69/265* (2013.01); *C08G 69/28* (2013.01); *C08G 69/42* (2013.01);
(Continued)

(58) Field of Classification Search
CPC ...... C08G 69/32; C08G 69/265; C08G 69/28; C08G 69/42; C08G 81/00; C08J 7/046;
(Continued)

(56) References Cited

U.S. PATENT DOCUMENTS 3,554,966 A   1/1971  Jones et al.
5,076,817 A   12/1991 Hayes
(Continued)

FOREIGN PATENT DOCUMENTS

CN    1708537 A    12/2005
CN    104072757 A  10/2014
(Continued)

OTHER PUBLICATIONS

Extended European Search Report dated Aug. 3, 2021 of the corresponding European Patent Application No. 19882480.7, 6 pages.
(Continued)

*Primary Examiner* — Shane Fang
(74) *Attorney, Agent, or Firm* — ROTHWELL, FIGG, ERNST & MANBECK, P.C.

(57) ABSTRACT

The present invention relates to a polyamide resin having a main chain having a structure in which two polyamide segments are linked in an alternating way, a preparation method thereof, and a polyamide film and resin laminate including the same.

10 Claims, 2 Drawing Sheets

(30) Foreign Application Priority Data

| Feb. 1, 2019 | (KR) | 10-2019-0014022 |
| Mar. 26, 2019 | (KR) | 10-2019-0034611 |
| Oct. 11, 2019 | (KR) | 10-2019-0125890 |
| Oct. 31, 2019 | (KR) | 10-2019-0137544 |
| Oct. 31, 2019 | (KR) | 10-2019-0137545 |

(51) Int. Cl.
| C08G 69/28 | (2006.01) |
| C08G 69/42 | (2006.01) |
| C08G 81/00 | (2006.01) |
| C08J 5/18 | (2006.01) |
| C08J 7/046 | (2020.01) |
| C08L 77/10 | (2006.01) |

(52) U.S. Cl.
CPC .............. *C08G 81/00* (2013.01); *C08J 5/18* (2013.01); *C08J 7/046* (2020.01); *C08L 77/10* (2013.01); *C08J 2377/10* (2013.01); *C08L 2201/08* (2013.01); *C08L 2201/10* (2013.01); *C08L 2203/16* (2013.01); *C08L 2203/20* (2013.01); *C08L 2203/30* (2013.01)

(58) Field of Classification Search
CPC ......... C08J 5/18; C08J 2377/10; C08L 77/10; C08L 2201/08; C08L 2201/10; C08L 2203/16; C08L 2203/20; C08L 2203/30
See application file for complete search history.

(56) References Cited

U.S. PATENT DOCUMENTS

| 7,851,061 B2 | 12/2010 | Han et al. |
| 8,648,982 B2 | 2/2014 | Yanai et al. |
| 8,759,476 B2 | 6/2014 | Desbois et al. |
| 8,834,755 B2 | 9/2014 | Han et al. |
| 9,963,548 B1 | 5/2018 | Sun et al. |
| 10,316,145 B2 | 6/2019 | Park et al. |
| 10,526,451 B2 | 1/2020 | Ju et al. |
| 10,738,173 B2 | 8/2020 | Chae et al. |
| 2006/0106193 A1 | 5/2006 | Moriyama et al. |
| 2006/0201664 A1 | 9/2006 | Yamasaki |
| 2006/0235169 A1 | 10/2006 | Yamasaki |
| 2012/0238698 A1 | 9/2012 | Cho et al. |
| 2012/0296037 A1* | 11/2012 | Cho ............... C09J 177/10 524/607 |
| 2013/0038822 A1 | 2/2013 | Aono et al. |
| 2016/0208096 A1 | 7/2016 | Sun et al. |
| 2017/0298181 A1 | 10/2017 | Rulkeno et al. |
| 2017/0329062 A1 | 11/2017 | Nakajima et al. |
| 2019/0023846 A1 | 1/2019 | Yun et al. |
| 2019/0077915 A1 | 3/2019 | Yun et al. |

FOREIGN PATENT DOCUMENTS

| EP | 1564237 A1 | 8/2005 |
| EP | 3366726 A1 | 8/2018 |
| EP | 3412705 A1 | 12/2018 |
| EP | 3392295 B1 | 1/2020 |
| FR | 1487392 A | 7/1967 |
| JP | S56-056827 A | 5/1981 |
| JP | S63-267548 A | 11/1988 |
| JP | H09-158094 A | 6/1997 |
| JP | 2001-325720 A | 11/2001 |
| JP | 2002-191928 A | 7/2002 |
| JP | 2008-074991 A | 4/2008 |
| JP | 2010-530459 A | 9/2010 |
| JP | 2015-120886 A | 7/2015 |
| JP | 2016-108482 A | 6/2016 |
| JP | 2017-530218 A | 10/2017 |
| KR | 10-1987-0001695 B1 | 9/1987 |
| KR | 10-2005-0067217 A | 6/2005 |
| KR | 10-2007-0061778 A | 6/2007 |
| KR | 10-2009-0062498 A | 6/2009 |
| KR | 10-2010-0138364 A | 12/2010 |
| KR | 10-2012-0129319 A | 11/2012 |
| KR | 10-2012-0130332 A | 11/2012 |
| KR | 10-2013-0066618 A | 6/2013 |
| KR | 10-2015-0070757 A | 6/2015 |
| KR | 10-2015-0077177 A | 7/2015 |
| KR | 10-2016-0089872 A | 7/2016 |
| KR | 10-2017-0001644 A | 1/2017 |
| KR | 10-2017-0131217 A | 11/2017 |
| KR | 10-2017-0132499 A | 12/2017 |
| KR | 10-2017-0136285 A | 12/2017 |
| KR | 10-2018-0062439 A | 6/2018 |
| KR | 10-2018-0098003 A | 9/2018 |
| KR | 10-2018-0104304 A | 9/2018 |
| WO | 2004-039863 A1 | 5/2004 |
| WO | 2011-132680 A1 | 10/2011 |
| WO | 2018-016138 A1 | 1/2018 |

OTHER PUBLICATIONS

Extended European Search Report dated Aug. 9, 2021, of the corresponding European Patent Application No. 19881443.6, 7 pages.

Extended European Search Report dated Aug. 5, 2021, of the corresponding European Patent Application No. 19881153.1, 7 pages.

International Search Report in PCT/KR2019/014714, Feb. 18, 2020, 4 pages.

International Search Report in PCT/KR2019/014715, Feb. 19, 2020, 3 pages.

International Search Report in PCT/KR2019/014716, Feb. 19, 2020, 2 pages.

Singh, P. S., et al., "Synchrotron SAX to probe cross-linked network of polyamide 'reverse osmosis' and nanofiltration membranes," J. of Membrane Science, vol. 421-422, 2012, pp. 51-59.

Yebra-Rodriguez, A., et al., "Crystalline properties of injection molded polyamide-6 and polyamide-6/montmorillonite nanocomposites," Applied Clay Science, Jan. 2009 vol. 43, Issue 1, pp. 91-97.

Chen, H., et al., "Investigation of the rigid amorphous fraction in nylon-6," J. of Thermal Analysis and Calorimetry, vol. 89 (2007) 2, pp. 417-425.

\* cited by examiner

POLYAMIDE RESIN, PREPARATION METHOD THEREFOF, AND POLYAMIDE FILM AND RESIN LAMINATE COMPRISING THE SAME

CROSS-REFERENCE TO RELATED APPLICATION(S)

This application is a 35 U.S.C. 371 National Phase Entry Application from PCT/KR2019/014714, filed on Nov. 1, 2019, designating the United States, which claims the benefit of priority from Korean Patent Application No. 10-2018-0134755 filed on Nov. 5, 2018; Korean Patent Application No. 10-2018-0153911 filed on Dec. 3, 2018; Korean Patent Application No. 10-2019-0014022 filed on Feb. 1, 2019; Korean Patent Application No. 10-2019-0034611 filed on Mar. 26, 2019; Korean Patent Application No. 10-2019-0125890 filed on Oct. 11, 2019; Korean Patent Application No. 10-2019-0137544 filed on Oct. 31, 2019; and Korean Patent Application No. 10-2019-0137545 filed on Oct. 31, 2019 in the Korean Intellectual Property Office, the disclosures of which are incorporated herein by reference in their entirety.

TECHNICAL FIELD

The present invention relates to a polyamide resin capable of realizing excellent mechanical properties and having improved transparency, a method for preparing the same, and a polyamide film and resin laminate including the same.

BACKGROUND OF THE INVENTION

Aromatic polyimide resins are polymers mostly having an amorphous structure, and exhibits excellent heat resistance, chemical resistance, electrical properties, and dimensional stability due to their rigid chain structure. Thus, these polyimide resins are widely used as materials for electric/electronics.

However, the polyimide resins have many limitations in their use because they may appear dark brown in color due to charge transfer complex (CTC) formation of Pi-electrons present in the imide chain, and it is difficult to secure transparency. In the case of the polyimide film including the same, it has a drawback in that the surface is easily scratched and scratch resistance is very weak.

In order to solve the above limitation of the polyimide resin, studies on polyamide resins into which an amide group is introduced has been actively conducted. The amide structure induces intermolecular or intramolecular hydrogen bonds, resulting in improvement of scratch resistance by interactions such as hydrogen bonds.

However, due to the difference in solubility, reactivity (steric hindrance), and reaction rate of terephthaloyl chloride or isophthaloyl chloride used for the synthesis of the polyamide resin, amide repeating units derived from terephthaloyl chloride and amide repeating units derived from isophthaloyl chloride do not form a block, and are hardly polymerized ideally or alternatively.

Therefore, there is a limit that as the block of amide repeating units derived from the para acyl chloride monomer is formed and the crystallinity of the polyamide resin increases, the transparency becomes poor due to haze.

In addition, as the monomers used for the synthesis of the polyamide resin perform the polymerization reaction in a state dissolved in a solvent, the molecular weight of the finally synthesized polyamide resin is difficult to be ensured to a sufficient level due to deterioration by moisture or mixing in solvents.

Accordingly, there is a continuing need to develop a polyamide resin capable of realizing transparency and mechanical properties simultaneously.

BRIEF SUMMARY OF THE INVENTION

The present invention provides a polyamide resin capable of realizing excellent mechanical properties and having improved transparency.

The present invention also provides a preparation method of the polyamide resin for synthesizing the aforementioned polyamide resin.

The present invention further provides a polymer film and resin laminate using the aforementioned polyamide resin.

One aspect of the present invention provides a polyamide resin which includes: a first polyamide segment including a repeating unit represented by the following Chemical Formula 1 or a block composed thereof; and a second polyamide segment including a repeating unit represented by the following Chemical Formula 2, or a block composed thereof, wherein the first polyamide segment and the second polyamide segment form a main chain including an alternating repeating unit represented by the following Chemical Formula 3.

[Chemical Formula 1]

[Chemical Formula 2]

[Chemical Formula 3]

in Chemical Formulas 1 to 2, $Ar_1$ and $Ar_2$ are each independently a substituted or unsubstituted arylene group having 6 to 20 carbon atoms, or a substituted or unsubstituted heteroarylene group having 2 to 20 carbon atoms, and in Chemical Formula 3, A is the first polyamide segment, and B is the second polyamide segment. Another aspect of the present invention provides a method for preparing a polyamide resin including a step of melt-kneading a compound represented by the following Chemical Formula 7 and a compound represented by the following Chemical Formula 8, and solidifying the melt-kneaded product to form a complex; and a step of reacting the complex with an aromatic diamine monomer.

[Chemical formula 7]

[Chemical formula 8]

in Chemical Formulas 7 to 8, X is a halogen or a hydroxyl group.

Another aspect of the present invention provides a polymer film which includes: a polyamide resin including a first polyamide segment including a repeating unit represented by Chemical Formula 1 or a block composed thereof; and a second polyamide segment including a repeating unit represented by Chemical Formula 2, or a block composed thereof, wherein the first polyamide segment and the second polyamide segment form a main chain including an alternating repeating unit represented by Chemical Formula 3.

Yet another aspect of the present invention provides a resin laminate which includes: a substrate including a polyamide resin including a first polyamide segment including a repeating unit represented by Chemical Formula 1 or a block composed thereof; and a second polyamide segment including a repeating unit represented by Chemical Formula 2, or a block composed thereof, wherein the first polyamide segment and the second polyamide segment form a main chain including an alternating repeating unit represented by Chemical Formula 3; and a hard coating layer formed on at least one side of the substrate.

DETAILED DESCRIPTION OF THE INVENTION

Hereinafter, a polyamide resin, a preparation method thereof, and a polyamide film and resin laminate including the same according to specific embodiments of the present invention will be described in more detail.

I. Polyamide Resin

According to one embodiment of the present invention, there can be provided a polyamide resin which includes: a first polyamide segment including a repeating unit represented by Chemical Formula 1 or a block composed thereof; and a second polyamide segment including a repeating unit represented by Chemical Formula 2, or a block composed thereof, wherein the first polyamide segment and the second polyamide segment form a main chain including an alternating repeating unit represented by Chemical Formula 3.

The present inventors have found through experiments that as the polyamide resin includes: a first polyamide segment including a repeating unit represented by Chemical Formula 1 or a block composed thereof; and a second polyamide segment including a repeating unit represented by Chemical Formula 2, or a block composed thereof, wherein the first polyamide segment and the second polyamide segment form a main chain including an alternating repeating unit represented by Chemical Formula 3, as in the polyamide resin of one embodiment, it is possible to minimize the growth of the length of the first polyamide segment, which is a polymer block composed of repeating units derived from terephthaloyl chloride within the polyamide resin and lower the crystallinity of the polyamide resin, thus implementing a transparent polyamide resin. The present invention has been completed on the basis of such finding.

Specifically, in the main chain of the polyamide resin, a first polyamide segment including an amide repeating unit derived from a combination of a 1,4-aromatic diacyl compound and an aromatic diamine compound, and a second polyamide segment including an amide repeating unit derived from a combination of a 1,3-aromatic diacyl compound and an aromatic diamine compound, or a repeating unit derived from a combination of a 1,2-aromatic diacyl compound and an aromatic diamine compound alternately form a polymer chain as shown in Chemical Formula 3. That is, the second polyamide segment is positioned between the first polyamide segments, and may serve to suppress the growth of the length of the first polyamide segment.

When the growth of the length of the first polyamide segment is suppressed in this manner, the haze value of the polyamide resin can be remarkably lowered while the crystal properties are reduced, thereby achieving excellent transparency.

On the other hand, "in the main chain of the polyamide resin, a first polyamide segment including an amide repeating unit derived from a combination of a 1,4-aromatic diacyl compound and an aromatic diamine compound and a second polyamide segment including an amide repeating unit derived from a combination of a 1,3-aromatic diacyl compound and an aromatic diamine compound, or a repeating unit derived from a combination of a 1,2-aromatic diacyl compound and an aromatic diamine compound may alternately form a polymer chain as shown in Chemical Formula 3" is considered to be due to the formation of a melt-kneaded complex in the preparation method of the polyamide resin of the present invention described hereinafter.

Hereinafter, embodiments of the present invention will be described in more detail.

Unless explicitly stated otherwise, the terminology used herein may be defined as follows.

Throughout the specification, when one part "includes" one constituent element, unless otherwise specifically described, this does not mean that another constituent element is excluded, but means that another constituent element may be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be the same as or different from each other.

As used herein, the term, "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a haloalkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked. Preferably, a haloalkyl group can be used as the substituent, and examples of the haloalkyl group include trifluoromethyl group.

As used herein, the notation ⟶, or ------ means a bond linked to another substituent group, and a direct bond means the case where no other atoms exist in the parts represented as L.

In the present specification, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methyl-hexyl, 2,6-dimethylheptane-4-yl and the like, but are not limited thereto.

In the present specification, the aryl group is a monovalent functional group derived from an arene, and is not particularly limited, but preferably has 6 to 20 carbon atoms, and may be a monocyclic aryl group or a polycyclic aryl group. The monocyclic aryl group may include, but not limited to, a phenyl group, a biphenyl group, a terphenyl group, or the like. The polycyclic aryl group may include, but not limited to, a naphthyl group, an anthracenyl group, a phenanthryl group, a pyrenyl group, a perylenyl group, a chrysenyl group, a fluorenyl group or the like. The aryl group may be substituted or unsubstituted.

In the present specification, the arylene group is a bivalent functional group derived from an arene, and the description of the aryl group as defined above may be applied, except that it is a divalent functional group. For example, it may be a phenylene group, a biphenylene group, a terphenylene group, a divalent naphthalene group, a divalent fluorenyl group, a divalent pyrenyl group, a divalent phenanthrenyl group, a divalent perylene group, a divalent tetracenyl group, an divalent anthracenyl group and the like. The arylene group may be substituted or unsubstituted.

In the present specification, a heteroaryl group includes one or more atoms other than carbon, that is, one or more heteroatoms, and specifically, the heteroatom may include one or more atoms selected from the group consisting of O, N, Se, and S, and the like. The number of carbon atoms thereof is not particularly limited, but is preferably 4 to 20, and the heteroaryl group may be monocyclic or polycyclic. Examples of a heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benz- imidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, an aziridyl group, an azaindolyl group, an isoindolyl group, an indazolyl group, a purine group (purine), a pteridyl group (pteridine), a beta-carboline group, a naphthyridyl group (naphthyridine), a ter-pyridyl group, a phenazinyl group, an imidazopyridyl group, a pyropyridyl group, an azepine group, a pyrazolyl group, a dibenzofuranyl group, and the like, but are not limited thereto. The heteroaryl group may be substituted or unsubstituted.

In the present specification, the hetero arylene group has 2 to 20, or 2 to 10, or 6 to 20 carbon atoms. For the arylene group containing O, N or S as a hetero atom, the description of the heteroaryl group as defined above can be applied except that it is a divalent functional group. The hetero arylene group may be substituted or unsubstituted.

In this specification, examples of halogen include fluorine, chlorine, bromine or iodine.

The polyamide resin may include a first polyamide segment including a repeating unit represented by Chemical Formula 1 or a block composed thereof; and a second polyamide segment including a repeating unit represented by Chemical Formula 2, or a block composed thereof.

In Chemical Formula 1 and Chemical Formula 2, $Ar_1$ and $Ar_2$ are the same as or different from each other and are each independently an arylene group having 6 to 20 carbon atoms that is substituted with one or more substituents selected from the group consisting of an alkyl group, a haloalkyl group, and an amino group. More preferably, it may be a 2,2'-bis(trifluoromethyl)-4,4'-biphenylene group.

More specifically, in Chemical Formula 1 and Chemical Formula 2, $Ar_1$ and $Ar_2$ may be a divalent organic functional group derived from an aromatic diamine monomer. Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. The aromatic diamine monomer may be 2,2'-bis(trifluoromethyl)-4,4'-biphenyldiamine (TFDB) or 2,2'-dimethyl-4,4'-diaminobenzidine.

The first polyamide segment may include a repeating unit represented by Chemical Formula 1 or a block composed of a repeating unit represented by Chemical Formula 1.

Specific examples of the repeating unit represented by Chemical Formula 1 include a repeating unit represented by the following Chemical Formula 1-1.

[Chemical Formula 1-1]

The repeating unit represented by Chemical Formula 1 is an amide repeating unit derived from a combination of a 1,4-aromatic diacyl compound and an aromatic diamine compound, specifically, an amide repeating unit formed by an amidation reaction of terephthaloyl chloride or terephthalic acid with an aromatic diamine monomer. Due to the linear molecular structure, the chain packing and alignment can be kept constant in the polymer, and the surface hardness and mechanical properties of the polyamide film can be improved.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine), 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone), 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4,4'-biphenyldiamine.

The first polyamide segment may have a number average molecular weight of 100 g/mol or more and 5000 g/mol or less, or 100 g/mol or more and 3000 g/mol or less, or 100 g/mol or more and 2500 g/mol or less, or 100 g/mol or more and 2450 g/mol or less. When the number average molecular weight of the first polyamide segment is increased by more than 5000 g/mol, the chains of the first polyamide segment become excessively long and so the crystallinity of the polyamide resin can be increased. As a result, it may have a high haze value and so it may be difficult to secure transparency. Examples of the measuring method of the number average molecular weight of the first polyamide segment is not limited, but for example, it can be confirmed through a small-angle X-ray scattering (SAXS) analysis.

The first polyamide segment may be represented by the following Chemical Formula 5.

[Chemical Formula 5]

in Chemical Formula 5, $Ar_1$ is a substituted or unsubstituted arylene group having 6 to 20 carbon atoms, or a substituted or unsubstituted heteroarylene group having 2 to 20 carbon atoms, and a is an integer of 1 to 5. In Chemical Formula 5, when a is 1, the Formula 5 may be a repeating unit represented by Chemical Formula 1. In Chemical Formula 5, when a is 2 to 5, the Formula 5 may be a block composed of repeating units represented by Chemical Formula 1. In Chemical Formula 5, the details concerning $Ar_1$ includes those described above in Chemical Formula 1.

Based on the total repeating units contained in the polyamide resin, the ratio of the repeating units represented by Chemical Formula 1 may be 40 mol % to 95 mol %, 50 mol % to 95 mol %, or 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %.

In this manner, the polyamide resin in which the repeating unit represented by Chemical Formula 1 is contained in the above-described content can ensure a sufficient level of molecular weight, thereby ensuring excellent mechanical properties.

The second polyamide segment may include a repeating unit represented by Chemical Formula 2, or a block composed of the repeating unit represented by Chemical Formula 2. The repeating unit represented by Chemical Formula 2 may include an amide repeating unit derived from a combination of a 1,3-aromatic diacyl compound and an aromatic diamine compound, or a repeating unit derived from a combination of a 1,2-aromatic diacyl compound and an aromatic diamine compound, or mixtures thereof.

More specifically, the repeating unit represented by Chemical Formula 2 may include one type of repeating unit selected from a repeating unit represented by the following Chemical Formula 2-1; or a repeating unit represented by Chemical Formula 2-2.

[Chemical Formula 2-1]

[Chemical Formula 2-2]

in Chemical Formulas 2-1 to 2-2, $Ar_2$ is a substituted or unsubstituted arylene group having 6 to 20 carbon atoms, or a substituted or unsubstituted heteroarylene group having 2 to 20 carbon atoms. The details concerning $Ar_2$ includes those described above in Chemical Formula 2.

The repeating unit represented by Chemical Formula 2-1 is an amide repeating unit derived from a combination of a 1,3-aromatic diacyl compound and an aromatic diamine compound, specifically, a repeating unit formed by an amidation reaction of isophthaloyl chloride with an aromatic diamine monomer, and the repeating unit represented by Chemical Formula 2-2 is an amide repeating unit derived from a combination of a 1,2-aromatic diacyl compound with an aromatic diamine compound, specifically, a repeating unit formed by an amidation reaction of phthaloyl chloride with an aromatic diamine monomer.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,2-aromatic diacyl compound includes phthaloyl chloride, or phthalic acid, the 1,3-aromatic diacyl compound includes isophthaloyl chloride or isophthalic acid, and the aromatic diamine compound may include 2,2'-bis(trifluoromethyl)-4,4'-biphenyldiamine.

Specific examples of the repeating unit represented by Chemical Formula 2-1 include a repeating unit represented by the following Chemical Formula 2-4.

[Chemical Formula 2-4]

Specific examples of the repeating unit represented by Chemical Formula 2-2 include a repeating unit represented by the following Chemical Formula 2-5.

[Chemical Formula 2-5]

On the other hand, the second polyamide segment may be represented by the following Chemical Formula 6.

[Chemical Formula 6]

In Chemical Formula 6, each $Ar_2$ is independently a substituted or unsubstituted arylene group having 6 to 20 carbon atoms, or a substituted or unsubstituted heteroarylene group having 2 to 20 carbon atoms, and b is an integer of 1 to 3 or 1 to 2. In Chemical Formula 6, when b is 1, the Formula 6 may be a repeating unit represented by Chemical Formula 2. In Chemical Formula 6, when b is 2 to 3, the Formula 6 may be a block composed of repeating units represented by Chemical Formula 2.

The repeating unit represented by Chemical Formula 2 is a repeating unit formed by an amidation reaction of isophthaloyl chloride, isophthalic acid or phthaloyl chloride, phthalic acid and an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as this is included in the polyamide resin together with the repeating unit represented by Chemical Formula 1, it is possible to increase the molecular weight of the polyamide resin.

Based on the total repeating units contained in the polyamide resin, the ratio of the repeating unit represented by Chemical Formula 2 may be 5 mol % to 60 mol %, or 5 mol % to 50 mol %, or 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

As described above, the polyamide resin in which the repeating unit represented by Chemical Formula 2 is contained in the above-described content can suppress the length growth of the chains consisting of only the specific repeating unit represented by Chemical Formula 1 and thus lower the crystallinity of the resin. As a result, it is possible to have a low haze value and thus secure excellent transparency.

More specifically, based on the total repeating units contained in the polyamide resin, the content of the repeating unit represented by Chemical Formula 1 may be 60 mol % to 90 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %, and the content of the repeating unit represented by Chemical Formula 2 may be 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

That is, the polyamide resin can increase the molar content of the repeating unit represented by Chemical Formula 1 and thus maximize the effect of improving the surface hardness and mechanical properties of the polyamide film according to the chain packing and alignment within the polymer due to the linear molecular structure of the repeating unit represented by Chemical Formula 1. In addition, although the repeating unit represented by Chemical Formula 2 has a relatively low molar content, it may suppress the length growth of the chains consisting of only the specific repeating unit represented by Chemical Formula 1, thereby lowering the crystallinity of the resin. As a result, it is possible to have a low haze value and thus secure excellent transparency.

The first polyamide segment and the second polyamide segment may form a main chain including an alternating repeating unit represented by the following Chemical Formula 3. That is, the repeating unit represented by Chemical Formula 3 may be included in the main chain of the polyamide resin of the one embodiment.

Specifically, in the main chain of the polyamide resin, a first polyamide segment including an amide repeating unit derived from a combination of a 1,4-aromatic diacyl compound and an aromatic diamine compound, and a second polyamide segment including an amide repeating unit derived from a combination of a 1,3-aromatic diacyl compound and an aromatic diamine compound, or an amide repeating unit derived from a combination of a 1,2-aromatic diacyl compound and an aromatic diamine compound may alternately form a polymer chain as shown in Chemical Formula 3. That is, the second polyamide segment is positioned between the first polyamide segments, and may serve to suppress the growth of the length of the first polyamide segment.

When the growth of the length of the first polyamide segment is suppressed in this manner, the haze value of the polyamide resin can be remarkably lowered while the crystal properties are reduced, thereby achieving excellent transparency.

On the other hand, "in the main chain of the polyamide resin, a first polyamide segment including a repeating unit derived from terephthaloyl chloride or terephthalic acid and a second polyamide segment including a repeating unit derived from isophthaloyl chloride, isophthalic acid or phthaloyl chloride, phthalic acid may alternately form a polymer chain as shown in Chemical Formula 3" is considered to be due to the formation of a melt-kneaded complex in the preparation method of the polyamide resin of the present invention described hereinafter.

More specifically, the alternating unit represented by Chemical Formula 3 may be a repeating unit represented by the following Chemical Formula 4.

The polyamide resin may have a polydispersity index of 3.0 or less, or 2.9 or less, or 2.8 or less, or 1.5 to 3.0, or 1.5 to 2.9, or 1.6 to 2.8, or 1.8 to 2.8. Through such narrow range of polydispersity index, the polyamide resin can improve mechanical properties such as bending properties or hardness properties. When the polydispersity index of the polyamide resin becomes too wide by more than 3.0, there is a limit that it is difficult to improve the above-described mechanical properties to a sufficient level.

The haze of the polyamide resin measured according to ASTM D1003 may be 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%. When the haze of the polyamide resin measured according to ASTM D1003 is increased by more than 3.0%, the opacity is increased and thus it is difficult to secure a sufficient level of transparency.

Preferably, the polyamide resin satisfies the weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol, and simultaneously it may have the haze

[Chemical Formula 4]

in Chemical Formula 4, $Ar_1$ and $Ar_2$ are each independently a substituted or unsubstituted arylene group having 6 to 20 carbon atoms, or a substituted or unsubstituted heteroarylene group having 2 to 20 carbon atoms, a1 and a2 are the same as or different from each other and are each independently an integer of 1 to 10, or 1 to 5, and b1 and b2 are the same as or different from each other and are each independently an integer of 1 to 5, or 1 to 3.

It can be confirmed through the haze value of the polyamide resin that the alternating repeating unit represented by Chemical Formula 3 is included in the main chain of the polyamide resin of the one embodiment. More specifically, it can be confirmed through a small-angle X-ray scattering (SAXS) analysis.

The polyamide resin may have a weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol.

The reason why the weight average molecular weight of the polyamide resin is measured to be high is considered to be due to the formation of a melt-kneaded complex in the preparation method of the polyamide resin of another embodiment of the present invention described hereinafter. When the weight average molecular weight is reduced to less than 330,000 g/mol, the polyamide resin has a problem that mechanical properties such as flexibility and pencil hardness are lowered.

measured according to ASTM D1003 of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%.

The polyamide resin may have a relative viscosity (measured according to ASTM D 2196) of 45000 cps or more, or 60000 cps or more, or 45000 cps to 500000 cps, or 60000 cps to 500000 cps, or 70000 cps to 400000 cps, or 80000 cps to 300000 cps, or 100000 cps to 200000 cps, or 110000 cps to 174000 cps. When the relative viscosity of the polyamide resin (measured according to ASTM D 2196) is reduced to less than 45000 cps, there is a limit that in the film molding process using the polyamide resin, the molding processability is lowered and the efficiency of the molding process is lowered.

II. Method for Preparing Polyamide Resin

According to another embodiment of the invention, there can be provided a method for preparing a polyamide resin including a step of melt-kneading a compound represented by Chemical Formula 7 and a compound represented by Chemical Formula 8, and solidifying the melt-kneaded product to form a complex; and a step of reacting the complex with an aromatic diamine monomer.

The present inventors have found through experiments that when the compound represented by Chemical Formula 7 and the compound represented by Chemical Formula 8 are mixed at a temperature equal to or higher than the melting point as in the method for preparing the polyamide resin, it is possible to prepare a complex of monomers mixed uniformly through the melting of the compound represented by Chemical Formula 7 and the compound represented by Chemical Formula 8, and that as this complex is reacting with an aromatic diamine monomer, an amide repeating unit derived from the compound represented by Chemical Formula 7, or a block composed thereof, and an amide repeat uniting derived from the compound represented by Chemical Formula 8, or a block composed thereof can be alternatively polymerized, thereby completing the present invention.

That is, the polyamide resin of one embodiment can be obtained by the preparation method of the polyamide resin of another embodiment.

Specifically, each of the compound represented by Chemical Formula 7 and the compound represented by Chemical Formula 8 exhibits different aspects in solubility and reactivity due to chemical structural differences. Therefore, even when they are added simultaneously, there is a limit in that the amide repeating unit derived from the compound represented by Chemical Formula 7 is predominantly formed and long blocks are formed, thereby increasing the crystallinity of the polyamide resin and making it difficult to secure transparency.

Thus, in the preparation method of the polyamide resin, the compound represented by Chemical Formula 7 and the compound represented by Chemical Formula 8 are not simply physically mixed, but through the formation of a complex by melt-kneading at a temperature higher than each melting point, each monomer was induced to react relatively evenly with the aromatic diamine monomer.

Meanwhile, when synthesizing existing polyamide resin, as the compound represented by Chemical Formula 7 and the compound represented by Chemical Formula 8 are dissolved in a solvent and then reacted with an aromatic diamine monomer in a solution state, there was a limit in that due to the deterioration by moisture or mixing in solvents, the molecular weight of the finally synthesized polyamide resin decreases. Further, due to the difference in the solubility of the compound represented by Chemical Formula 7 and the compound represented by Chemical Formula 8, the amide repeating unit derived from the compound represented by Chemical Formula 7 is predominantly formed and long blocks are formed, thereby increasing the crystallinity of the polyamide resin and making it difficult to secure transparency.

Thus, in the preparation method of the polyamide resin, as a complex obtained by melt-kneading the compound represented by Chemical Formula 7 and the compound represented by Chemical Formula 8 are reacted with the aromatic diamine monomer dissolved in the organic solvent in the form of a solid powder through cooling at a temperature lower than each melting point (minus 10° C. to 30° C., or 0° C. to 30° C., or 10° C. to 30° C.), the molecular weight of the finally synthesized polyamide resin was confirmed to be improved, and it was confirmed through experiments that excellent mechanical properties are secured.

Specifically, the method for preparing the polyamide resin according to the other embodiment may include melt-kneading the compound represented by Chemical Formula 7 and the compound represented by Chemical Formula 8, and solidifying the melt-kneaded product to form a complex.

In the compound represented by Chemical Formula 7, X is a halogen or a hydroxyl group. Preferably, in Chemical Formula 7, X is chlorine. Specific examples of the compound represented by Chemical Formula 7 include terephthaloyl chloride or terephthalic acid.

The compound represented by Chemical Formula 7 may form a repeating unit represented by Chemical Formula 1 by an amidation reaction of an aromatic diamine monomer. Due to the linear molecular structure, the chain packing and alignment can be kept constant in the polymer, and the surface hardness and mechanical properties of the polyamide film can be improved.

In the compound represented by Chemical Formula 8, X is a halogen or a hydroxyl group. Preferably, in Chemical Formula 8, X is chlorine. Specific examples of the compound represented by Chemical Formula 8 include phthaloyl chloride, phthalic acid, isophthaloyl chloride, or isophthalic acid.

The compound represented by Chemical Formula 8 may form a repeating unit represented by Chemical Formula 2 by an amidation reaction of an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as the repeating unit represented by Chemical Formula 2 derived from the compound represented by Chemical Formula 8 is included in the polyamide resin together with the repeating unit represented by Chemical Formula 1, it is possible to increase the molecular weight of the polyamide resin.

Meanwhile, in the step of melt-kneading a compound represented by Chemical Formula 7 and a compound represented by Chemical Formula 8, and solidifying the melt-kneaded product to form a complex, the melt-kneading means mixing the compound represented by Chemical Formula 7 and the compound represented by Chemical Formula 8 at a temperature equal to or higher than the melting point.

In this manner, the compound represented by Chemical Formula 7 and the compound represented by Chemical Formula 8 are not simply physically mixed, but through the formation of a complex by melt-kneading at a temperature higher than each melting point, each monomer was induced to react relatively evenly with the aromatic diamine monomer.

Due to the difference in the solubility of the compound represented by Chemical Formula 7 and the compound represented by Chemical Formula 8, the amide repeating unit derived from the compound represented by Chemical Formula 7 is predominantly formed and long blocks are formed, thereby increasing the crystallinity of the polyamide resin and making it difficult to secure transparency. Therefore, in order to solve these limitations, the first polyamide segment and the second polyamide segment can alternately form a main chain including alternating repeating units represented by Chemical Formula 3 as in one embodiment or another embodiment.

At this time, with respect to 100 parts by weight of the compound represented by Chemical Formula 7, the compound represented by Chemical Formula 8 may be mixed at 5 parts by weight to 60 parts by weight, or 5 parts by weight to 50 parts by weight, or 5 parts by weight to 25 parts by weight, or 10 parts by weight to 30 parts by weight, or 15 parts by weight to 25 parts by weight. Thereby, the technical effect of increasing transmittance and clarity can be realized. When the compound represented by Chemical Formula 8 is mixed in an excessively small amount of less than 5 parts by weight with respect to 100 parts by weight of the compound represented by Chemical Formula 7, the technical problems such as becoming opaque and the increase of haze may occur. When the compound represented by Chemical Formula 8 is mixed in an excessively high amount of more than 60 parts by weight with respect to 100 parts by weight of the compound represented by Chemical Formula 7, the technical problems such as the reduction of physical properties (hardness, tensile strength, etc.) may occur.

In addition, in forming the complex by solidifying the melt-kneaded product, the solidifying means a physical change in which the melt-kneaded product in the molten state is cooled to a temperature equal to or less than the melting point and solidified. Thereby, the formed complex may be in a solid state. More preferably, the complex may be a solid powder obtained through an additional grinding process or the like.

Meanwhile, the step of melt-kneading a compound represented by Chemical Formula 7 and a compound represented by Chemical Formula 8, and solidifying the melt-kneaded product to form a complex may include a step of mixing the compound represented by Chemical Formula 7 and the compound represented by Chemical Formula 8 at a temperature of 50° C. or higher; and a step of cooling the result of the mixing step.

The terephthaloyl chloride has a melting point of 81.3° C. to 83° C., the isophthaloyl chloride has a melting point of 43° C. to 44° C., and the phthaloyl chloride may have a melting point of 6° C. to 12° C. Thereby, when these are mixed at a temperature of 50° C. or higher, or 90° C. or higher, or 50° C. to 120° C., or 90° C. to 120° C., or 95° C. to 110° C., or 100° C. to 110° C., melt-kneading may be performed under the condition of temperature higher than the melting point of both the compound represented by Chemical Formula 7 and the compound represented by Chemical Formula 8.

In the step of cooling the result of the mixing step, the result of the melt-kneading step is left at 5° C. or below, or minus 10° C. to plus 5° C., or minus 5° C. to plus 5° C., which is a temperature condition lower than the melting point of both the compound represented by Chemical Formula 7 and the compound represented by Chemical Formula 8, so that a more uniform solid powder can be obtained through cooling.

Meanwhile, after the step of cooling the result of the mixing step, the method may further include a step of grinding the result of the cooling step. Through the grinding step, a solid complex can be prepared in powder form, and the powder obtained after the grinding step may have an average particle size of 1 mm to 10 mm.

Grinders used for grinding with such particle sizes specifically include a pin mill, a hammer mill, a screw mill, a roll mill, a disc mill, a jog mill or sieve, a jaw crusher, and the like, but are not limited to the examples described above.

In this manner, as the melt mixture of the compound represented by Chemical Formula 7 and the compound represented by Chemical Formula 8 is reacted with the aromatic diamine monomer in the form of solids, specifically solid powders, through the cooling at a temperature lower than the melting point, the deterioration the compound represented by Chemical Formula 7 and the compound represented by Chemical Formula 8 due to moisture or their mixing in solvents is minimized, the molecular weight of the finally synthesized polyamide resin is increased, and thereby excellent mechanical properties of the polyamide resin can be ensured.

In addition, after the step of melt-kneading a compound represented by the following Chemical Formula 7 and a compound represented by the following Chemical Formula 8, and solidifying the melt-kneaded product to form a complex, the method for preparing the polyamide resin according to the other embodiment may include a step of reacting the complex with an aromatic diamine monomer.

The reaction in the step of reacting the complex with an aromatic diamine monomer may be performed under an inert gas atmosphere at a temperature condition of minus 25° C. to 25° C. or a temperature condition of minus 25° C. to 0° C.

Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

More preferably, as the aromatic diamine monomer, 2,2'-bis(trifluoromethyl)-4,4'-biphenyldiamine (TFDB), 2,2'-dimethyl-4,4'-diaminobenzidine, m-xylylenediamine, or p-xylylenediamine can be used.

More specifically, the step of reacting the complex with an aromatic diamine monomer may include a step of dissolving the aromatic diamine monomer in an organic solvent to prepare a diamine solution; and a step of adding a complex powder to the diamine solution.

In the step of dissolving the aromatic diamine monomer in an organic solvent to prepare a diamine solution, the aromatic diamine monomer included in the diamine solution may be present in a state dissolved in an organic solvent. Examples of the solvent are not particularly limited, but for example, common general-purpose organic solvents such as N-methylformamide, N,N-dimethylformamide, N,N-diethylformamide, N,N-dimethylacetamide, N,N-diethylacetamide, N,N-dimethylpropionamide, 3-methoxy-N,N-dimethylpropionamide, dimethyl sulfoxide, acetone, N-methyl-2-pyrrolidone, N-ethyl-2-pyrrolidone, tetrahydrofuran, chloroform, gamma-butyrolactone, ethyl lactate, methyl 3-methoxypropionate, methyl isobutyl ketone, toluene, xylene, methanol, ethanol, or the like can be used without limitation.

In the step of adding a complex powder to the diamine solution, the complex powder will react with the aromatic diamine monomer dissolved in the diamine solution. As a result, the deterioration the compound represented by Chemical Formula 7 and the compound represented by Chemical Formula 8 due to moisture, or their mixing in solvents is minimized, the molecular weight of the finally synthesized polyamide resin is increased, and thereby excellent mechanical properties of the polyamide resin can be ensured.

After the step of cooling the result of the mixing step, the complex powder can prepare a complex of solids in the form of powder through the step of grinding the result of the cooling step. The powder obtained after the grinding step may have an average particle size of 1 mm to 10 mm.

III. Polymer Film

According to another embodiment of the invention, there may be provided a polymer film which includes: a first polyamide segment including a repeating unit represented by the following Chemical Formula 1 or a block composed thereof; and a second polyamide segment including a repeating unit represented by the following Chemical Formula 2, or a block composed thereof, wherein the first polyamide segment and the second polyamide segment form a main chain including an alternating repeating unit represented by the following Chemical Formula 3.

[Chemical Formula 1]

[Chemical Formula 2]

[Chemical Formula 3]

in Chemical Formulas 1 and 2, $Ar_1$ and $Ar_2$ are each independently a substituted or unsubstituted arylene group having 6 to 20 carbon atoms, or a substituted or unsubstituted heteroarylene group having 2 to 20 carbon atoms, and in Chemical Formula 3, A is the first polyamide segment, and B is the second polyamide segment. The details concerning the polyamide resin can include all of those described in the one embodiment.

More specifically, the polymer film may include a polyamide resin of one embodiment or a cured product thereof. The cured product means a material obtained through a curing process of the polyamide resin of the one embodiment.

When the film is prepared using the polyamide resin of the one embodiment, excellent optical and mechanical properties can be realized, and simultaneously flexibility can be provided, so that it can be used as a material for various molded articles. For example, the polyamide film may be applied to a display substrate, a display protective film, a touch panel, a window cover of a foldable device, and the like.

The thickness of the polyamide film is not particularly limited, but for example, it can be freely adjusted within the range of 0.01 μm to 1000 μm. When the thickness of the polyamide film increases or decreases by a specific value, the physical properties measured in the polyamide film may also change by a certain value.

The polyamide film may be prepared by a conventional method such as a dry method or a wet method using the polyamide resin of the one embodiment. For example, the polyamide film may be formed by a method of coating a solution containing the polyamide resin of one embodiment on an arbitrary support to form a film, evaporating the solvent from the membrane and drying it. If necessary, stretching and heat treatment of the polyamide film may be further performed.

As the polyamide film is produced using the polyamide resin of the one embodiment, it may exhibit excellent mechanical properties while being colorless and transparent.

Specifically, the polyamide film has a haze value measured for a specimen having a thickness of 50±2 μm according to ASTM D1003 of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%. When the haze the polyamide film measured according to ASTM D1003 is increased by more than 3.0%, the opacity is increased and thus it is difficult to secure a sufficient level of transparency. The polymer film may have a haze value measured for a specimen having a thickness of 45 μm or more and 55 μm or less according to ASTM D1003 of 3.0% or less.

The polyamide film has a yellowness index (YI) measured for a specimen having a thickness of 50±2 μm according to ASTM E313 of 4.0 or less, or 3.0 or less, or 0.5 to 4.0, or 0.5 to 3.0. When the yellowness index (YI) of the polyamide film measured according to ASTM E313 is increased by more than 4.0, the opacity is increased and thus it is difficult to secure a sufficient level of transparency.

Further, the polyamide film may have a transmittance (T, @550 nm) for visible light at wavelength of 550 nm for a specimen having a thickness of 50±2 μm of 86% or more, or 86% to 90%. The transmittance (T, @388 nm) for UV light at wavelength of 388 nm may be 50.00% or more, or 60.00% or more.

Further, the polyamide film may have a folding endurance measured for a specimen having a thickness of 50±2 μm (the number of reciprocating bending cycles at an angle of 135°, a rate of 175 rpm, a radius of curvature of 0.8 mm and a load of 250 g) of 4000 cycles or more, or 7000 cycles or more, or 9000 cycles or more, or 4000 cycles to 20000 Cycles, or 7000 cycles to 20000 cycles, or 9000 cycles to 20000 cycles.

Further, the polyamide film may have a pencil hardness value measured for a specimen having a thickness of 50±2 μm according to ASTM D3363 of 1H or more, or 3H or more, or 1H to 4H, or 3H to 4H.

IV. Resin Laminate

According to yet another aspect of the present invention, there can be provided a resin laminate which includes a substrate including a polyamide resin including a first polyamide segment including a repeating unit represented by the following Chemical Formula 1 or a block composed thereof; and a second polyamide segment including a repeating unit represented by the following Chemical Formula 2, or a block composed thereof, wherein the first polyamide segment and the second polyamide segment form a main chain including an alternating repeating unit represented by the following Chemical Formula 3; and a hard coating layer formed on at least one side of the substrate.

[Chemical Formula 1]

[Chemical Formula 2]

[Chemical Formula 3]

in Chemical Formulas 1 and 2, $Ar_1$ and $Ar_2$ are each independently a substituted or unsubstituted arylene group having 6 to 20 carbon atoms, or a substituted or unsubstituted heteroarylene group having 2 to 20 carbon atoms, and in Chemical Formula 3, A is the first polyamide segment, and B is the second polyamide segment. The details concerning the polyamide resin can include all of those described in the one embodiment.

The substrate may include the polyamide resin of one embodiment, and it may also include a polymer film of the other embodiment. The details concerning the polyamide resin may include all of those described in the one embodiment, and the details concerning the polymer film may include all of those described in the other embodiment.

A hard coating layer may be formed on at least one side of the substrate. A hard coating layer may be formed on one side or both sides of the substrate. When the hard coating layer is formed only on one side of the substrate, a polymer film including one or more polymers selected from the group consisting of polyimide-based, polycarbonate-based, polyester-based, polyalkyl(meth)acrylate-based, polyolefin-based and polycyclic olefin-based polymers may formed on the opposite side of the substrate.

The hard coating layer may have a thickness of 0.1 μm to 100 μm.

The hard coating layer can be used without particular limitation as long as it is a material known in the field of hard coating. For example, the hard coating layer may include a binder resin of photocurable resin; and inorganic particles or organic particles dispersed in the binder resin.

The photocurable resin contained in the hard coating layer is a polymer of a photocurable compound which can cause a polymerization reaction when irradiated with light such as ultraviolet rays, and may be one conventionally used in the art. However, preferably, the photocurable compound may be a polyfunctional (meth)acrylate monomer or oligomer. At this time, it is advantageous in terms of ensuring the physical properties of the hard coating layer that the number of (meth)acrylate-based functional groups is 2 to 10, 2 to 8, or 2 to 7. Alternatively, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The inorganic particles may be, for example, silica, metal atoms such as silica, aluminum, titanium, or zinc, or oxides or nitrides thereof. Silica fine particles, aluminum oxide particles, titanium oxide particles, zinc oxide particles, and the like can be used independently of each other.

The inorganic particles may have an average radius of 100 nm or less, or 5 to 100 nm. The type of the organic particles is not limited, and for example, polymer particles having an average particle size of 10 nm to 100 μm may be used.

The resin laminate can be used as a substrate or a cover window of a display device, or the like. It has high flexibility and bending durability together with high transmittance and low haze properties, so that it can be used as a substrate or cover window of a flexible display device. That is, the display device including the resin laminate, or the flexible display device including the resin laminate may be implemented.

Advantageous Effects

According to the present invention, there can be provided a polyamide resin capable of realizing excellent mechanical properties and having improved transparency, a method for preparing the same, and a polyamide film and resin laminate including the same.

DETAILED DESCRIPTION OF THE EMBODIMENTS

Hereinafter, embodiments of the present invention will be described in more detail by way of examples. However, these examples are presented for illustrative purposes only, and are not intended to limit the scope of the present invention.

Preparation Example: Preparation of Acyl Chloride Complex>

Preparation Example 1

549.4 g (2.704 mol) of terephthaloyl chloride (TPC; melting point: 83° C.) and 120.6 g (0.594 mol) of isophthaloyl chloride (IPC; melting point: 44° C.) were added to a 1000 mL 4-neck round flask (reactor) equipped with a stirrer, a nitrogen injection device, a dropping funnel and a temperature controller, and the mixture was melt-kneaded at 100° C. for 3 hours and then cooled at 0° C. for 12 hours to prepare a complex of acylchloride (specifically, terephthaloyl chloride and isophthaloyl chloride).

Subsequently, the acyl chloride complex was grinded with a jaw crusher to prepare a powder having an average particle size of 5 mm.

Preparation Example 2

An acylchloride complex was prepared in the same manner as in Preparation Example 1, except that 569.5 g (2.803 mol) of terephthaloyl chloride (TPC; melting point: 83° C.) and 100.5 g (0.495 mol) of isophthaloyl chloride (IPC; melting point: 44° C.) were added.

Example: Preparation of Polyamide Resin and Film

Example 1

(1) Polyamide Resin 262 g of N,N-dimethylacetamide (DMAc) was filled into a 500 mL 4-neck round flask (reactor) equipped with a stirrer, a nitrogen injection device, a dropping funnel and a temperature controller while slowly blowing nitrogen into the reactor. Then, the temperature of the reactor was adjusted to 0° C., and 14.153 g (0.0442 mol) of 2,2'-bis(trifluoromethyl)-4,4'-biphenyldiamine (TFDB) was added and dissolved.

The mixture was stirred while adding 8.972 g (0.0442 mol) of the acyl chloride complex powder obtained in Preparation Example 1, and subjected to amide formation reaction at 0° C. for 12 hours.

After completion of the reaction, N,N-dimethylacetamide (DMAc) was added to dilute the solution to a solid content of 5% or less, and the resultant was precipitated with 1 L of methanol. The precipitated solids were filtered and then dried at 100° C. under vacuum for 6 hours or more to prepare a solid-state polyamide resin.

Figure 1:
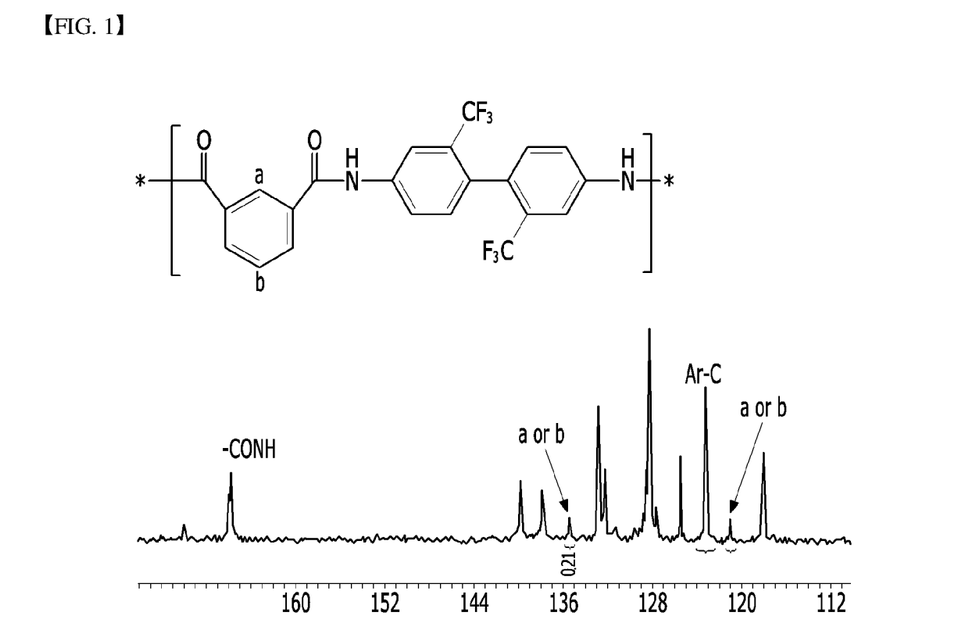
FIG. 1 shows a $^{13}$C-NMR spectrum of the polyamide resin obtained in (I) of Example 1.

It was confirmed through $^{13}$C-NMR shown in FIG. 1 that the polyamide resin obtained in (1) of Example 1, contained 82 mol % of the first repeating unit obtained by an amide reaction of terephthaloyl chloride (TPC) and 2,2'-bis(trifluoromethyl)-4,4'-biphenyldiamine (TFDB) and 18 mol % of the second repeating unit obtained by an amide reaction of isophthaloyl chloride (IPC) and 2,2'-bis(trifluoromethyl)-4,4'-biphenyldiamine (TFDB).

(2) Polyamide Film

The polyamide resin obtained in (1) of Example 1 was dissolved in N,N-dimethylacetamide to prepare about 10% (w/v) polymer solution.

The polymer solution was applied onto a polyimide base film (UPILEX-75s, UBE), and the thickness of the polymer solution was uniformly adjusted using a film applicator.

Then, after drying for 15 minutes at 80° C. Mathis oven, it was cured for 30 minutes at 250° C. while flowing nitrogen, and peeled from the substrate film to obtain a polyamide film.

Example 2

(1) Polyamide Resin

A polyamide resin was prepared in the same manner as in (1) of Example 1, except that the acyl chloride complex powder obtained in Preparation Example 2 was used instead of the acyl chloride complex powder obtained in Preparation Example 1.

Figure 2:
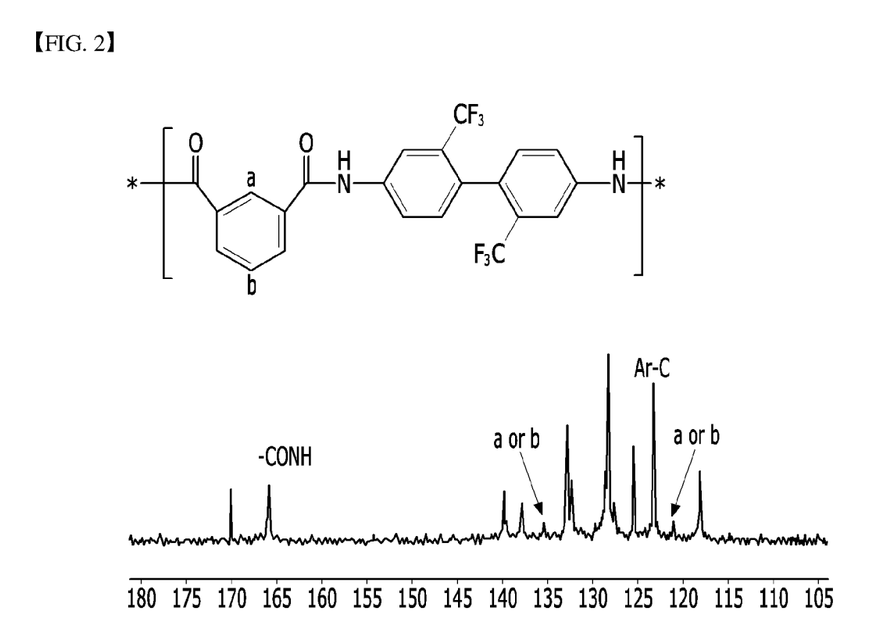
FIG. 2 shows a $^{13}$C-NMR spectrum of the polyamide resin obtained in (1) of Example 2.

It was confirmed through $^{13}$C-NMR shown in FIG. 2 that the polyamide resin obtained in (1) of Example 2, contained 85 mol % of the first repeating unit obtained by an amide reaction of terephthaloyl chloride (TPC) and 2,2'-bis(trifluoromethyl)-4,4'-biphenyldiamine (TFDB), and 15 mol % of the second repeating unit obtained by an amide reaction of isophthaloyl chloride (IPC) and 2,2'-bis(trifluoromethyl)-4,4'-biphenyldiamine (TFDB).

(2) Polyamide Film

A polyamide film was prepared in the same manner as in (2) of Example 1, except that the polyamide resin obtained in (1) of Example 2 was used instead of the polyamide resin obtained in (1) of Example 1.

Comparative Example: Preparation of Polyamide Resin and Film

Comparative Example 1

(1) Polyamide Resin

A polyamide resin was prepared in the same manner as in (1) of Example 1, except that instead of the acyl chloride complex powder obtained in Preparation Example 1, 7.358 g (0.0362 mol) of terephthaloyl chloride (TPC) and 1.615 g (0.0080 mol) of isophthaloyl chloride (IPC) were added simultaneously to perform an amide formation reaction.

(2) Polyamide Film

A polyamide film was prepared in the same manner as in (2) of Example 1, except that the polyamide resin obtained in (1) of Comparative Example 1 was used instead of the polyamide resin obtained in (1) of Example 1.

Comparative Example 2

(1) Polyamide Resin

A polyamide resin was prepared in the same manner as in (1) of Example 1, except that instead of the acyl chloride complex powder obtained in Preparation Example 1, 7.358 g (0.0362 mol) of terephthaloyl chloride (TPC) was first added, and then 1.615 g (0.0080 mol) of isophthaloyl chloride (TPC) was added sequentially at about 5 minute intervals to perform an amide formation reaction.

(2) Polyamide Film

A polyamide film was prepared in the same manner as in (2) of Example 1, except that the polyamide resin obtained in (1) of Comparative Example 2 was used instead of the polyamide resin obtained in (1) of Example 1.

Comparative Example 3

(1) Polyamide Resin

A polyamide resin was prepared in the same manner as in (1) of Example 1, except that instead of the acyl chloride complex powder obtained in Preparation Example 1, 1.615 g (0.0080 mol) of isophthaloyl chloride (IPC) was first added, and then 7.358 g (0.0362 mole) of terephthaloyl chloride (TPC) was added sequentially at about 5 minute intervals to perform an amide formation reaction.

(2) Polyamide Film

A polyamide film was prepared in the same manner as in (2) of Example 1, except that the polyamide resin obtained in (1) of Comparative Example 3 was used instead of the polyamide resin obtained in (1) of Example 1.

Reference Example: Preparation of Polyamide Resin and Film

Reference Example 1

(1) Polyamide Resin 262 g of N,N-dimethylacetamide (DMAc) was filled into a 500 mL 4-neck round flask (reactor) equipped with a stirrer, a nitrogen injection device, a dropping funnel and a temperature controller while slowly blowing nitrogen into the reactor. Then, the temperature of the reactor was adjusted to 0° C., and 7.358 g (0.0362 mol) of terephthaloyl chloride (TPC) and 1.615 g (0.0080 mol) of isophthaloyl chloride (IPC) were dissolved.

The mixture was stirred while adding 14.153 g (0.0442 mol) of 2,2'-bis(trifluoromethyl)-4,4'-biphenyldiamine (TFDB), and subjected to amide formation reaction at 0° C. for 12 hours.

After completion of the reaction, N,N-dimethylacetamide (DMAc) was added to dilute the solution to a solid content of 5% or less, and the resultant was precipitated with 1 L of methanol. The precipitated solids were filtered and then dried at 100° C. under vacuum for 6 hours or more to prepare a solid-state polyamide resin.

(2) Polyamide Film

A polyamide film was prepared in the same manner as in (2) of Example 1, except that the polyamide resin obtained in (1) of Reference Example 1 was used instead of the polyamide resin obtained in (1) of Example 1.

Experimental Example

The following characteristics were measured or evaluated for the polyamide resins or the polyamide films obtained in Examples, Comparative Examples and Reference Examples, and the results are shown in Table 1 below.

(1) Thickness: The thickness of the polyamide film was measured using a thickness measuring device.

(2) Yellowness index (Y.I.): The yellowness index of the polyamide film was measured according to the measurement method of ASTM E313 using a COH-400 Spectrophotometer (NIPPON DENSHOKU INDUSTRIES).

(3) Transmittance: The total light transmittance of the polyamide film was measured using a Shimadzu UV-2600 UV-vis spectrometer. In the measurement results, the transmittance (T, @388 nm) for ultraviolet light at a wavelength of 388 nm and the transmittance (T, @550 nm) for visible light at wavelength of 550 nm were shown.
(4) Haze: The haze value of the polyamide film was measured according to the ASTM D1003 test method using a COH-400 Spectrophotometer (NIPPON DENSHOKU INDUSTRIES).
(5) Molecular weight and polydispersity index (PDI): The weight average molecular weight (Mw) and the number average molecular weight (Mn) of the polyamide resin were measured by gel permeation chromatography (GPC, manufactured by Waters), and the polydispersity index (PDI) was calculated by dividing the weight average molecular weight by the number average molecular weight. Specifically, the measurement was performed using a 600 mm long column connecting two Polymer Laboratories PLgel MIX-B Columns (300 mm in length), through Waters 2605 Refractive Index (RI) Detector, wherein the evaluation temperature was 50 to 75° C. (about 65° C.), DMF 100 wt % solvent was used, the flow rate was 1 mL/min, and the sample was prepared at a concentration of 1 mg/mL and supplied in an amount of 100 μL for 25 minutes. The molecular weights could be determined using calibration curves formed using polystyrene standards. As the molecular weight of polystyrene standard products, 7 types of 3940/9600/31420/113300/327300/1270000/4230000 were used.
(6) Bending Property: The folding endurance of the polyamide films was evaluated using an MIT type folding endurance tester. Specifically, a specimen (1 cm*7 cm) of the polyamide film was loaded into the folding endurance tester, and folded to an angle of 135° at a rate of 175 rpm on the left and right sides of the specimen, with a radius of curvature of 0.8 mm and a load of 250 g, until the specimen was bended and fractured. The number of reciprocating bending cycles was measured as the folding endurance.
(7) Viscosity: Under a constant reflux system at 25±0.2° C., the viscosity of the solution containing polyamide resin (solvent: dimethylacetamide (DMAc), solid content: 10 wt %) was measured according to ASTM D 2196: test method of non-Newtonian materials by Brookfield DV-2T Rotational Viscometer. As Brookfield silicone standard oil, a number of standard solutions having a viscosity range of 5000 cps to 200000 cps was used. The measurement was performed with a spindle LV-4 (64), 0.3-100 RPM, and the unit was cps (mPa·s).
(8) Pencil Hardness: The pencil hardness of the polyamide films was measured according to the ASTM D3363 test method using a Pencil Hardness Tester. Specifically, varying hardness values of pencils were fixed to the tester and scratched on the polyamide film, and the degree of occurrence of a scratch on the polyamide film was observed with the naked eye or with a microscope. When more than 70% of the total number of scratches were not observed, a value corresponding to the hardness of the pencil was evaluated as the pencil hardness of the film.

The pencil hardness is increased in the order of B grade, F grade and H grade. Within the same grade, the higher the number, the higher the hardness. Within the grade, the higher the number, the higher the hardness.

TABLE 1

| Category | Example 1 | Example 2 | Comparative Example 1 | Comparative Example 2 | Comparative Example 3 | Reference Example 1 |
|---|---|---|---|---|---|---|
| Thickness (μm) | 50 | 49 | 51 | 51 | 50 | 50 |
| Y.I. | 2.68 | 2.89 | 8.55 | 25.10 | 4.59 | 2.28 |
| T (%)@550 nm | 88.75 | 88.50 | 85.63 | 75.94 | 87.57 | 88.82 |
| T (%)@388 nm | 75.3 | 71.0 | 51.01 | 31.62 | 65.04 | 74.24 |
| Haze(%) | 0.81 | 0.97 | 3.43 | 24.21 | 1.61 | 0.40 |
| Mw(g/mol) | 512000 | 463000 | 412000 | 350000 | 382000 | 321000 |
| Bending property (Cycle) | 12022 | 9785 | 5210 | 785 | 4513 | 6351 |
| PDI | 1.84 | 2.71 | 2.05 | 2.02 | 1.98 | 2.00 |
| Viscosity (cps) | 110000 | 174000 | 54000 | 24000 | 28000 | 18000 |
| Pencil hardness | 3 H | 4 H | 1 H | F | 1 H | 2 H |

Looking at Table 1 above, the polyamide resin of Examples prepared using the acyl chloride complex powder according to Preparation Examples 1 to 2 had a high weight average molecular weight of 463000 g/mol to 512000 g/mol, and the relative viscosity was measured to be as high as 110000 cps to 174000 cps. Moreover, it was confirmed that the polyamide film obtained from the polyamide resin of Examples had a low yellowness index of 2.68 to 2.89 and a low haze value of 0.81% to 0.97% at a thickness of about 50 μm, thereby exhibiting excellent transparency. It was also confirmed that it had a high pencil hardness of 3H to 4H grade and a folding endurance that was broken at the number of reciprocating bending cycles from 9785 to 12022, thereby securing excellent mechanical properties (scratch resistance and folding endurance). Meanwhile, in the case of the polyamide resins of Comparative Examples in which the acyl chloride complex powder according to Preparation Examples 1 to 2 was not used in the synthesis process of the polyamide resin, it had a molecular weight of 321,000 g/mol to 412,000 g/mol which was reduced compared to Examples and it had a viscosity of 18,000 cps to 54,000 cps was reduced compared to Examples.

On the other hand, in the case of the polyamide films obtained from the polyamide resins of Comparative Examples 1, 2, and 3 in which TPC powder and IPC powder were simultaneously or sequentially added, it was confirmed that the films had a yellowness index of 2.28 to 25.10 and a haze value of 1.61% to 24.21% at a thickness of about 50 μm, which increased compared to Examples, resulting in poor transparency. This is considered to be because, in Comparative Examples 1, 2, and 3, due to the difference in solubility and reactivity between the TPC powder and the IPC powder, the block due to TPC was excessively formed, thereby increasing the crystallinity of the polyamide resin.

Meanwhile, in the case of the polyamide resin of Reference Example 1, in which acyl chloride was dissolved in an amide-based solvent and treated in a solution, it was confirmed that it exhibited a very low molecular weight of 321,000 g/mol, the viscosity was significantly reduced to 18000 cps, it was broken at the number of reciprocating bending cycle of 6351, and the folding endurance was reduced than that of Examples. This is considered to be due to the occurrence of deterioration by moisture and mixing in amide solvents at the time of dissolving acyl chloride in Reference Example 1.

The invention claimed is:

1. A polyamide resin which comprises:
    a first polyamide segment including a repeating unit represented by the following Chemical Formula 1 or a block composed thereof; and
    a second polyamide segment including a repeating unit represented by the following Chemical Formula 2, or a block composed thereof,
    wherein the first polyamide segment and the second polyamide segment form a main chain including an alternating repeating unit represented by the following Chemical Formula 3:

[Chemical Formula 1]

[Chemical Formula 2]

[Chemical Formula 3]

in the Chemical Formulae 1 and 2,
$Ar_1$ and $Ar_2$ are each independently a substituted or unsubstituted arylene group having 6 to 20 carbon atoms, or a substituted or unsubstituted heteroarylene group having 2 to 20 carbon atoms, and in the Chemical Formula 3,
A is the first polyamide segment, and
B is the second polyamide segment,
wherein the polyamide resin has a weight average molecular weight of at least 330000 g/mol,
wherein a content of the repeating units represented by Chemical Formula 1 is in an amount of 80 mol % to 90 mol %, and a content of the repeating units represented by Chemical Formula 2 is in an amount of 10 mol % to 20 mol %, based on the total repeating units contained in the polyamide resin, and
wherein the polyamide resin has a haze measured according to ASTM D1003 of 3.0% or less.

2. The polyamide resin according to claim 1, wherein the polyamide resin has a relative viscosity of at least 45000 cps.

3. The polyamide resin according to claim 1, wherein the first polyamide segment has a number average molecular weight of 100 g/mol or more and 5000 g/mol or less.

4. The polyamide resin according to claim 1, wherein the repeating unit represented by Chemical Formula 2 comprises a repeating unit represented by the following Chemical Formula 2-1; or a repeating unit represented by Chemical Formula 2-2:

[Chemical Formula 2-1]

[Chemical Formula 2-2]

in the Chemical Formulae 2-1 to 2-2,
$Ar_2$ is a substituted or unsubstituted arylene group having 6 to 20 carbon atoms, or a substituted or unsubstituted heteroarylene group having 2 to 20 carbon atoms.

5. The polyamide resin according to claim 1, wherein the alternating repeating unit represented by Chemical Formula 3 is a repeating unit represented by the following Chemical Formula 4:

[Chemical Formula 4]

in the Chemical Formula 4,
$Ar_1$ and $Ar_2$ are each independently a substituted or unsubstituted arylene group having 6 to 20 carbon atoms, or a substituted or unsubstituted heteroarylene group having 2 to 20 carbon atoms,
a1 and a2 are each independently an integer of 1 to 10, and
b1 and b2 are each independently an integer of 1 to 5.

6. The polyamide resin according to claim 1, wherein
the repeating unit represented by Chemical Formula 1 is
an amide repeating unit derived from a combination of
a 1,4-aromatic diacyl compound and an aromatic
diamine compound.

7. The polyamide resin according to claim 6, wherein
the 1,4-aromatic diacyl compound comprises terephthaloyl chloride, or terephthalic acid, and
the aromatic diamine compound comprises 2,2'-bis(trifluoromethyl)-4,4'-biphenyldiamine.

8. The polyamide resin according to claim 1, wherein
the repeating unit represented by Chemical Formula 2
comprises an amide repeating unit derived from a
combination of a 1,2-aromatic diacyl compound and an
aromatic diamine compound; or an amide repeating
unit derived from a combination of a 1,3-aromatic
diacyl compound and the aromatic diamine compound.

9. The polyamide resin according to claim 8, wherein
the 1,2-aromatic diacyl compound comprises phthaloyl
chloride, or phthalic acid,
the 1,3-aromatic diacyl compound comprises isophthaloyl
chloride or isophthalic acid, and
the aromatic diamine compound includes 2,2'-bis(trifluoromethyl)-4,4'-biphenyldiamine.

10. A resin laminate comprising: a substrate including the first polyamide resin of claim 1; and a hard coating layer formed on at least one side of the substrate.

* * * * *